US012281003B2

(12) United States Patent
Fedorka et al.

(10) Patent No.: US 12,281,003 B2
(45) Date of Patent: Apr. 22, 2025

(54) CARBONATED BEVERAGE NOZZLE FOR A BEVERAGE MACHINE

(71) Applicant: BEDFORD SYSTEMS LLC, Bedford, MA (US)

(72) Inventors: Thomas Fedorka, Bedford, MA (US); Andrew Briggs, Bedford, MA (US); Taylor Kazanova, Bedford, MA (US)

(73) Assignee: Bedford Systems LLC, Bedford, MA (US)

( * ) Notice: Subject to any disclaimer, the term of this patent is extended or adjusted under 35 U.S.C. 154(b) by 0 days.

(21) Appl. No.: 17/207,314

(22) Filed: Mar. 19, 2021

(65) Prior Publication Data

US 2021/0292152 A1 Sep. 23, 2021

Related U.S. Application Data

(60) Provisional application No. 62/992,633, filed on Mar. 20, 2020.

(51) Int. Cl.
*B67D 1/00* (2006.01)
*B67D 1/08* (2006.01)
*B67D 1/12* (2006.01)

(52) U.S. Cl.
CPC ......... *B67D 1/0884* (2013.01); *B67D 1/0072* (2013.01); *B67D 1/0857* (2013.01); *B67D 1/1202* (2013.01); *B67D 2001/0095* (2013.01)

(58) Field of Classification Search
CPC .. B67D 1/0021; B67D 1/0044; B67D 1/0043; B67D 1/0052; B67D 1/0057;
(Continued)

(56) References Cited

U.S. PATENT DOCUMENTS 2,537,119 A * 1/1951 Bauerlein ............ B67D 1/0052 239/416.4
2,979,267 A * 4/1961 Miller .................. A47G 21/181 215/388
(Continued)

FOREIGN PATENT DOCUMENTS

AU 2015236433 B2 10/2019
CA 3009979 A1 7/2017
(Continued)

OTHER PUBLICATIONS

International Search Report and Written Opinion for PCT/US2021/023300 dated Jun. 30, 2021.
(Continued)

*Primary Examiner* — Charles P. Cheyney
(74) *Attorney, Agent, or Firm* — Dorsey & Whitney LLP

(57) ABSTRACT

Described herein is a nozzle for controlling foam of a carbonated beverage product produced by a beverage making machine, and associated system and method of use thereof. The nozzle can include an engagement portion configured for releasable attachment with the beverage making machine. The nozzle can further include a funnel portion extending elongated from the engagement portion and that is configured to converge a flow of the carbonated beverage product. The nozzle can further include a dispense portion to establish a stream of the carbonated beverage product into a receptacle. An alignment feature on an exterior of the nozzle can define an offset between a wall of the receptacle and the stream of the carbonated beverage product.

9 Claims, 9 Drawing Sheets

(58) Field of Classification Search

CPC .. B67D 1/0022; B67D 1/0884; B67D 1/0072; B67D 1/0857; B67D 1/1202; B67D 2001/0095

USPC .......... 222/129.1, 129.4, 144.5, 145.1, 145.6

See application file for complete search history.

(56) References Cited

U.S. PATENT DOCUMENTS

| | | | | |
|---|---|---|---|---|
| 3,091,366 | A | 5/1963 | Hutsell | |
| 4,218,014 | A * | 8/1980 | Tracy | B67D 1/0049 222/145.5 |
| D289,682 | S * | 5/1987 | Dragan | D24/112 |
| 5,048,726 | A * | 9/1991 | McCann | B67D 1/0044 239/434 |
| D393,048 | S * | 3/1998 | Hearvey | D23/213 |
| 6,253,963 | B1 * | 7/2001 | Tachibana | B67D 1/0044 239/428 |
| D447,949 | S | 9/2001 | Richardson | |
| 6,871,761 | B2 * | 3/2005 | Fox | B67D 1/0021 222/145.5 |
| D532,242 | S * | 11/2006 | Aikens | D7/300.2 |
| 7,178,699 | B2 | 2/2007 | Spray et al. | |
| D560,965 | S | 2/2008 | Sommerfield | |
| 8,083,100 | B2 | 12/2011 | Minard et al. | |
| D694,055 | S | 11/2013 | Hirst | |
| 8,678,247 | B2 | 3/2014 | Haskayne et al. | |
| 9,434,594 | B2 * | 9/2016 | Kaneko | B67D 1/07 |
| D796,001 | S | 8/2017 | Carroll | |
| 9,993,837 | B2 * | 6/2018 | Ullett | B05C 17/0123 |
| 10,017,372 | B2 | 7/2018 | Bethuy et al. | |
| D833,194 | S * | 11/2018 | Ladjavardi | D7/682 |
| D833,195 | S | 11/2018 | McDonald et al. | |
| 10,351,409 | B2 * | 7/2019 | Smeller | F16K 1/04 |
| 10,507,479 | B2 | 12/2019 | Bertness et al. | |
| D875,257 | S | 2/2020 | Berkely | |
| D964,100 | S | 9/2022 | Yang | |
| 2004/0245287 | A1 | 12/2004 | Fox | |
| 2005/0072799 | A1 * | 4/2005 | Stratton | B67D 1/0027 222/129.1 |
| 2006/0016347 | A1 | 1/2006 | Girard et al. | |
| 2006/0237479 | A1 * | 10/2006 | Fox | B67D 1/0047 222/129.1 |
| 2006/0289563 | A1 * | 12/2006 | Ziesel | B67D 1/0052 222/145.1 |
| 2007/0211562 | A1 * | 9/2007 | Pitsis | A47G 21/181 366/129 |
| 2008/0302818 | A1 * | 12/2008 | Minard | B67D 1/10 222/63 |
| 2011/0062168 | A1 * | 3/2011 | Chow | B65D 1/04 220/705 |
| 2013/0340626 | A1 | 12/2013 | Oh | |
| 2017/0158483 | A1 * | 6/2017 | Gatipon | B01F 23/45 |
| 2017/0233234 | A1 | 8/2017 | Hecht et al. | |
| 2018/0117606 | A1 * | 5/2018 | Bertness | B01F 33/84 |
| 2018/0282143 | A1 * | 10/2018 | Chang | B67D 1/0021 |
| 2019/0112176 | A1 * | 4/2019 | Sevcik | B67D 1/145 |
| 2019/0292032 | A1 | 9/2019 | Azatin et al. | |
| 2019/0359467 | A1 * | 11/2019 | Ferro | B67D 1/0046 |
| 2020/0128852 | A1 | 4/2020 | Popov et al. | |
| 2020/0180931 | A1 * | 6/2020 | Crackel | B67D 1/0021 |
| 2021/0252534 | A1 * | 8/2021 | Eboigbodin | B01F 25/12 |
| 2021/0292152 | A1 | 9/2021 | Fedorka et al. | |

FOREIGN PATENT DOCUMENTS

| | | |
|---|---|---|
| WO | 2016064784 A1 | 4/2016 |
| WO | 2017087874 A1 | 5/2017 |

OTHER PUBLICATIONS

Extended European Search Report dated Mar. 21, 2024 for EP Application No. 21771967.3.

* cited by examiner

CARBONATED BEVERAGE NOZZLE FOR A BEVERAGE MACHINE

CROSS-REFERENCE TO RELATED APPLICATION

This application is a non-provisional patent application of, and claims priority to, U.S. Provisional Patent Application No. 62/992,633 filed Mar. 20, 2020, titled "CARBONATED BEVERAGE NOZZLE FOR A BEVERAGE MACHINE," the disclosure of which is hereby incorporated by reference in its entirety.

FIELD

The described embodiments relate generally to beverage dispensing systems, and more particularly to assemblies and techniques for producing carbonated beverages, including beer.

BACKGROUND

Self-serve appliances may be used to prepare beverages for a user. In many traditional systems, a user inserts a cartridge or capsule containing a powder or liquid substance, which may contain a target flavoring. The appliance can open the cartridge or capsule and combine the flavoring with water to generate a desired beverage. Many traditional systems suffer from significant drawbacks that affect the presentation and quality of carbonated beverages, such as beer, produced by the appliance. As such, the need continues for systems and techniques to facilitate carbonated beverage production.

SUMMARY

Embodiments of the present invention are directed to a nozzle for a beverage making machine. The nozzle can be adapted to control flow of a carbonated beverage product from the beverage making machine. For example, the nozzle can be an elongated structure that channels or converges a flow of the carbonated beverage product to a receptacle. More specifically, the nozzle can orientate the flow of the carbonated beverage product relative to the receptacle in order to induce a target foam height of the carbonated beverage product in the receptacle. The size, shape, and contour of the nozzle can be adapted to the characteristic of a target carbonated beverage product, such as a beer, thereby allowing the foam height to be tuned for a specific presentation of the beer in the receptacle.

While many embodiments and applications are presented herein, in one embodiment, a nozzle for controlling foam of a carbonated beverage product produced by a beverage making machine is disclosed. The nozzle includes an engagement portion configured for releasable attachment with the beverage making machine. The engagement portion defines a nozzle inlet adapted to receive the carbonated beverage product from the beverage making machine. The nozzle further includes a funnel portion extending elongated from the engagement portion. The funnel portion is configured to converge a flow of the carbonated beverage product. The nozzle further includes a dispense portion that defines a nozzle outlet. The nozzle outlet is configured to establish a stream of the carbonated beverage product into a receptacle. The nozzle further includes an alignment feature extending along an exterior of one or both of the funnel portion or the dispense portion. The nozzle portion is configured to define an offset between a wall of the receptacle and the stream of the carbonated beverage product.

In another embodiment, a beverage making machine is disclosed. The beverage making machine includes a cartridge holder arranged to hold a cartridge. The cartridge contains a beverage making material used by the beverage making machine to form a carbonated beverage product. The beverage making machine further incudes a basket assembly associated with the cartridge holder. The basket assembly defines an interface for selectively attaching one or more nozzles with the cartridge holder for receiving and dispensing of the carbonated beverage product. The beverage making machine further includes a nozzle of the one or more nozzles associated with and extending elongated from the basket assembly. The nozzle defines a stream of the carbonated beverage product into a receptacle. The nozzle is configured to induce a target foam height of the carbonated beverage product in the receptacle during a dispense operation of the beverage making machine.

In another embodiment, a method of producing a carbonated beverage product with a beverage making machine is disclosed. The method includes associating a cartridge with a cartridge holder of the beverage making machine. The cartridge contains a beverage making material used by the beverage making machine to form the carbonated beverage product. The carbonated beverage product has a target foam height in a dispensed format. The method further includes associating a nozzle with the cartridge holder. The nozzle is configured for inducing the target foam height of the carbonated beverage product. The nozzle defines an elongated section extending elongated from the cartridge holder for defining a stream of the carbonated beverage product. The method further includes associating a receptacle with the nozzle. The receptacle is adapted to receive the stream of the carbonated beverage product for presenting the carbonated beverage product in the dispensed format.

In addition to the exemplary aspects and embodiments described above, further aspects and embodiments will become apparent by reference to the drawings and by study of the following description.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1:
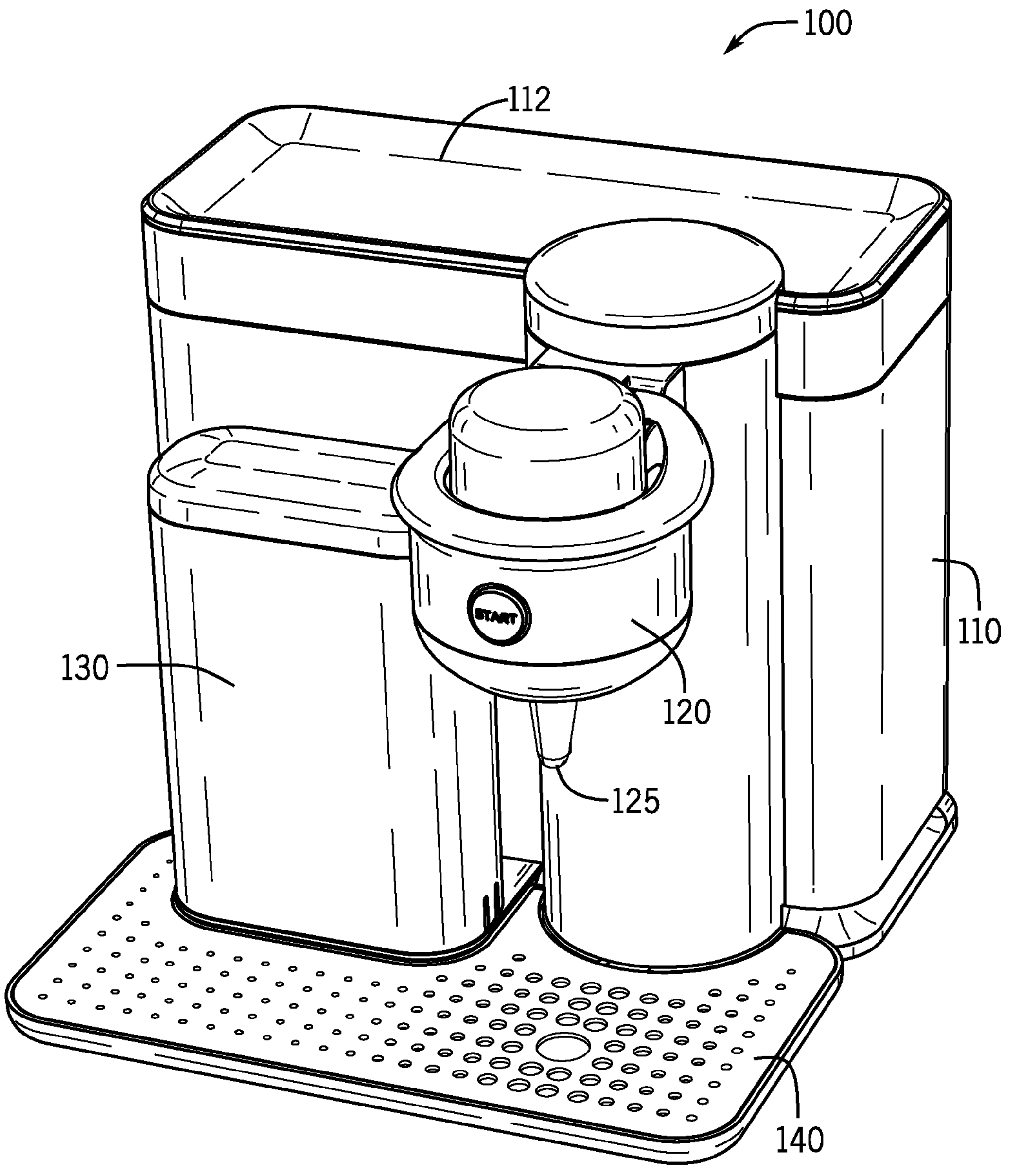
FIG. 1 depicts a sample beverage making machine.

The description that follows includes sample systems, methods, and apparatuses that embody various elements of the present disclosure. However, it should be understood that the described disclosure may be practiced in a variety of forms in addition to those described herein.

The present disclosure describes systems, devices, and techniques related to beverage systems and carbonated beverage production. A beverage system generally includes a beverage appliance and a beverage pod or cartridge. The beverage cartridge includes a beverage material that is used by the beverage appliance to produce a desired beverage, often a single serving. The beverage material may include, but is not limited to, certain powdered drink mixes, syrups, liquid mixes, concentrates, and so on, that are used by a beverage appliance to produce a desired beverage, such as a single serving coffee, tea, soda, seltzer, alcohol, and so on. In this manner, the desired beverage may include any of a range of carbonation levels, from a substantially noncarbonated coffee beverage to a soda, seltzer, or beer with a relatively high level of carbonation. Carbonated beverages, such as beer, may have a target foam height in a dispensed format. Excessive foam height in the final dispensed product can hinder the presentation, quality, and taste of the carbonated beverage product.

The beverage system of the present disclosure may mitigate such hindrances and induce a target foam height in the final dispensed product. In one example, a nozzle for the beverage making machine is disclosed. The nozzle can be configured to dispense a carbonated beverage product from the beverage making machine, and deliver the carbonated beverage product into a receptacle associated with the machine. The nozzle can have a shape, size, and contour that facilities consistent and repeatable foam generation in the receptacle for the carbonated beverage product. For example and as described herein, the nozzle can include a funnel portion defining an elongated section of the nozzle that extends at least partially into the receptacle and converges a flow of the carbonated beverage product as product enters the receptacle. The nozzle can also include an alignment feature on an exterior of nozzle to define an offset between the product stream and a wall of receptacle.

The nozzle can be selectively associated with the beverage making machine. For example, the beverage making machine can be adapted to produce a wide variety of beverages, including carbonated and substantially noncarbonated beverages. The nozzle can be associated with the beverage making machine as needed for producing the carbonated beverages. In this manner, a user can control the foam height of a beverage in a dispensed format by associating the nozzle with the beverage making machine. In some cases, different nozzles can be used, including nozzles that are tuned to induce different foam heights based on different carbonated beverage types, including different types of beer.

To facilitate the foregoing, the beverage making machine can include a cartridge holder and an associated basket assembly. The cartridge holder can operate to receive a beverage cartridge including a beverage making material, such as a material that is used to form the carbonated beverage product. As explained herein, the cartridge holder can be configured to secure and clamp the beverage cartridge within the beverage making machine. The cartridge holder can include or be associated with one or more mechanisms to facilitate opening and release of the beverage making material into the machine for making the carbonated beverage product. The basket assembly can be arranged substantially within the cartridge holder and define an interface, including a fluid interface, with the beverage cartridge. The basket assembly can also facilitate removable attachment of the nozzle with the beverage making machine. For example, the basket assembly can include one or more basket assembly engagement features for association with complementary engagement features of the nozzle. In this manner, a user can removably associate the nozzle of the present disclosure with the beverage making machine, which can be specifically tailored for carbonated beer products, and subsequently remove the nozzle and removably associate another nozzle with the machine which can be specially tailored for substantially non-carbonated beverage products.

Reference will now be made to the accompanying drawings, which assist in illustrating various features of the present disclosure. The following description is presented for purposes of illustration and description. Furthermore, the description is not intended to limit the inventive aspects to the forms disclosed herein. Consequently, variations and modifications commensurate with the following teachings, and skill and knowledge of the relevant art, are within the scope of the present inventive aspects.

FIG. 1 depicts a sample beverage making machine 100 including a nozzle 125, such as the beverage making machine and nozzle discussed above and described in greater detail below. The beverage making machine 100 can include a housing 110 that shields various components of the machine 100, a reservoir 130 that holds a liquid (e.g., water) used to form a beverage, and a drip tray 140 that supports a user's cup or other container for receiving a dispensed beverage.

The reservoir 130 can be removable from the housing 110 such that a user can fill the reservoir 130 with a beverage precursor liquid, such as water, that is used to form a beverage dispensed at a dispensing station 120 into a user's container. The reservoir 130 can include a movable lid that is configured to open the reservoir 130 to facilitate filling with the precursor liquid. In various examples, the reservoir 130 can be replaced by a plumbed connection to a direct or main water source. In this regard, the reservoir 130 can define a component of, and/or be associated more generally with, a precursor liquid supply. The beverage precursor liquid can be any suitable liquid, including water or any other suitable liquid used to form a beverage. The reservoir 130 or main water source can form part of a beverage precursor supply which provides the beverage precursor liquid for conditioning of some kind (e.g., filtering, chilling, carbonating, mixing with a beverage medium, and subsequent dispensing as a beverage).

Various components of the beverage making machine 100 can be located within the housing 110. For example, a pump can be located within the housing 110 and can move precursor liquid from the reservoir 130 to a carbonation system, where the precursor liquid can be carbonated via a gas. Depending on the particular application, the gas can be supplied by a pressurized canister or bottle, such as a carbon dioxide canister or bottle, located within the housing 110. In some examples, the precursor liquid can be chilled by a cooling system, either before, during, or after carbonation. Cooling the precursor liquid during carbonation can help the carbonation process. For instance, a cooler liquid tends to dissolve carbon dioxide or other gas more rapidly and/or is capable of dissolving a larger amount of gas. In some examples, the precursor liquid is cooled to about four degrees Celsius or lower to facilitate carbonation of the precursor liquid. The housing 110 can include a lid 112 that is articulable, and can be used to selectively enclose the various components of the beverage making machine 110 described herein.

Figure 7:
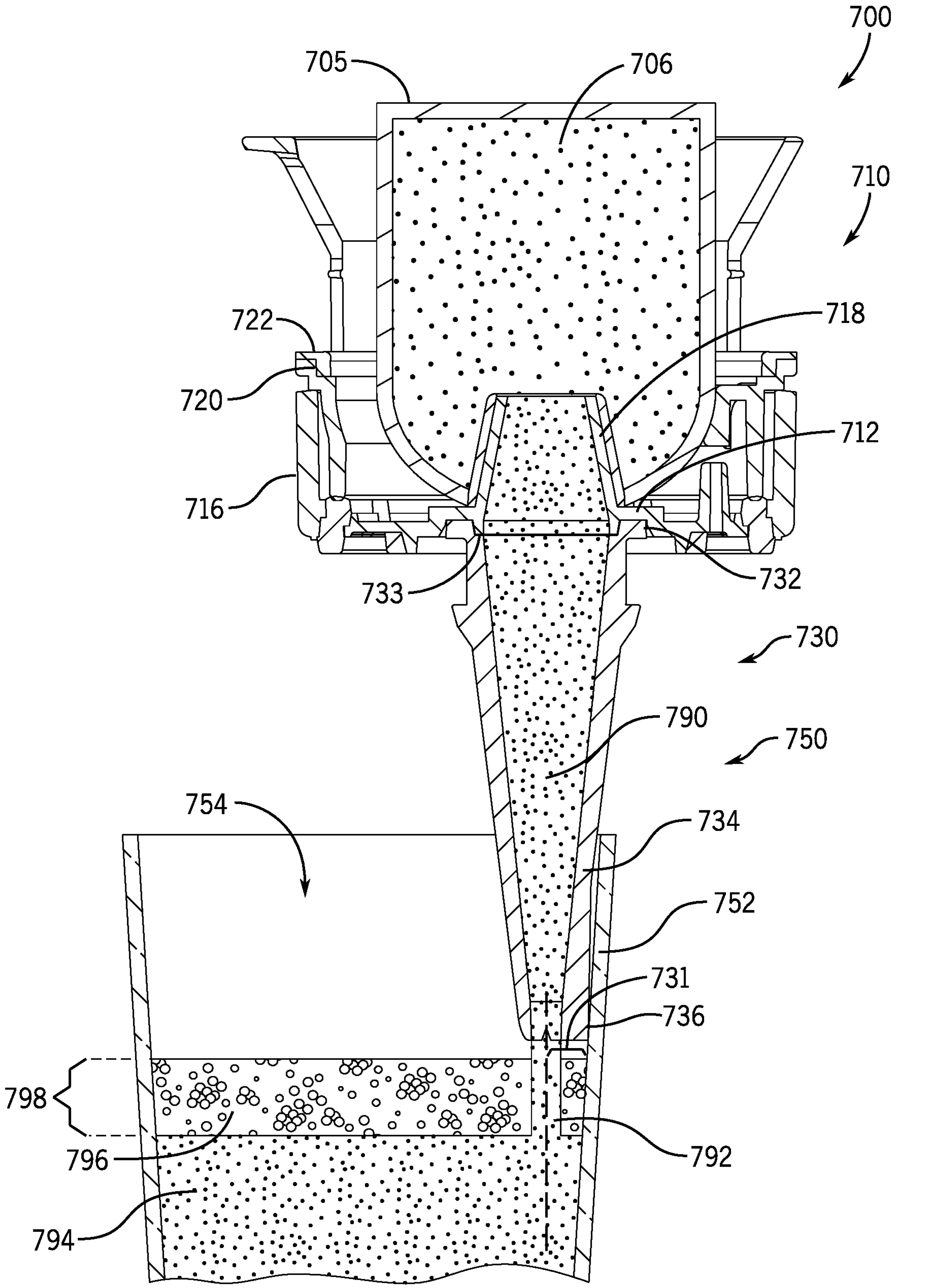
FIG. 7 depicts a cross-sectional view of a nozzle and associated assembly engaged in a dispense operation of a carbonated beverage product.
Figure 8:
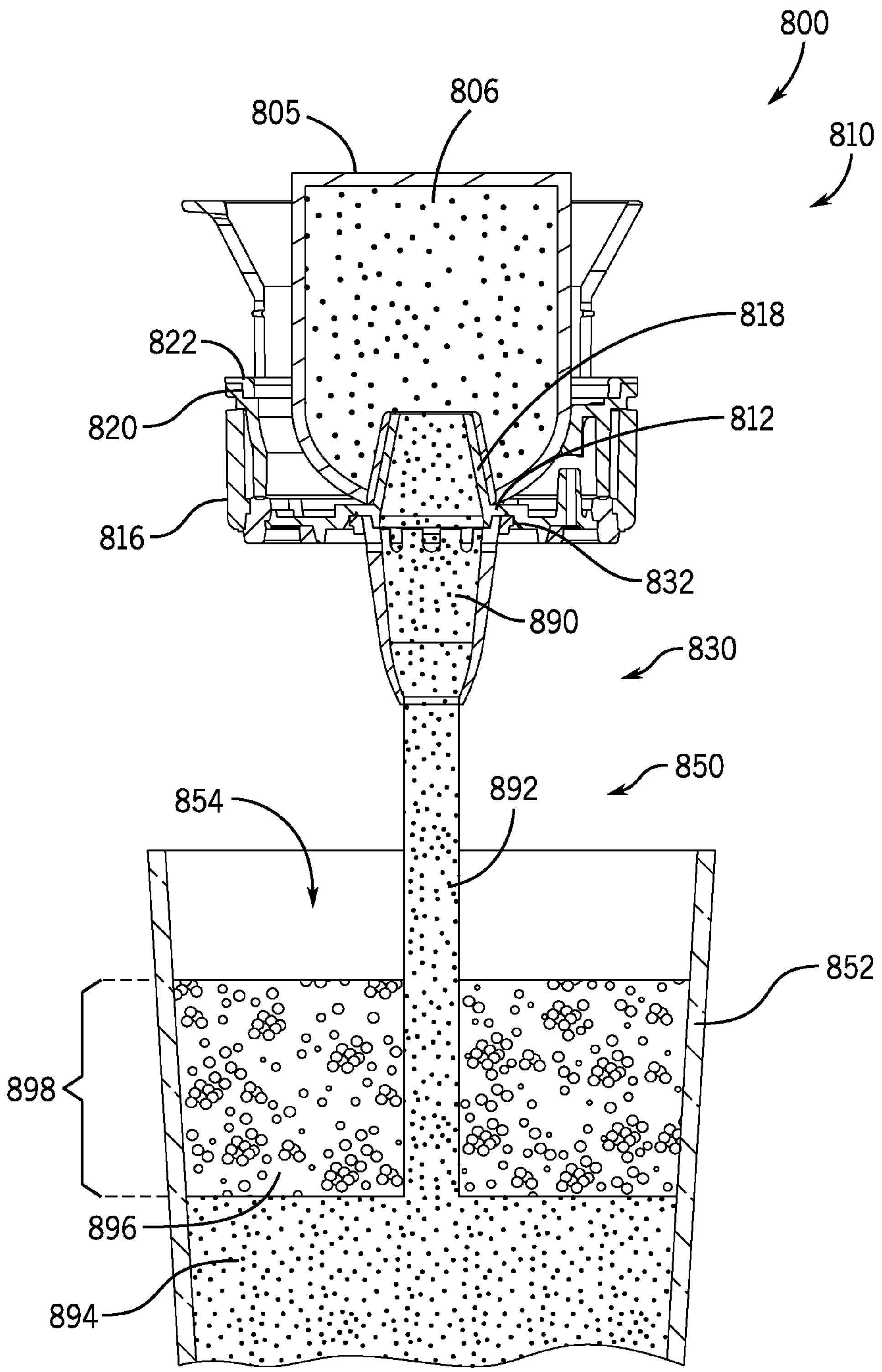
FIG. 8 depicts a cross-sectional view of another nozzle and associated assembly engaged in a dispense operation of a carbonated beverage product.

The carbonated liquid can be moved to the dispensing station 120 and dispensed into a container or receptacle (e.g., receptacles 750, 850 of FIGS. 7 and 8 herein). To generate a desired beverage, the carbonated liquid can be mixed with a beverage material 289 (e.g., a flavoring agent) contained in a beverage cartridge 280 (see FIG. 2). The beverage material 289 can be emptied from the beverage cartridge 280 in many ways. For instance, the beverage material 289 can drain from the beverage cartridge 280 by gravity. Additionally or alternatively, the beverage material 289 can be moved out of the beverage cartridge 280 by introducing gas or fluid into the beverage cartridge 280 under pressure, as explained more fully below Upon exit of the beverage material 289 from the cartridge 280, the beverage material 289 can be dispensed into the receptacle via the nozzle 125. As shown in FIG. 1, the nozzle 125 can be an elongated structure that extends from the dispensing station 120 and towards the drip tray 140. The receptacle can be held on the drip tray and the nozzle 125 can be arranged at least partially in the receptacle. The nozzle 125 can be operated to converge a stream of the beverage material 289, and carbonated beverage product more generally into the receptacle. As described herein, the nozzle 125 can have a shape, size, and configuration to induce a target foam height of the carbonated beverage product in the receptacle. For example, the nozzle 125 can include an alignment feature 127 at an exterior of the nozzle 125 and be used to establish an offset between a stream of the carbonated beverage product from the nozzle and the wall of the receptacle to induce the target foam height.

Control of the beverage making machine 100 and its components can be performed by control circuitry, which can include a programmed general purpose computer and/or other data processing devices along with suitable software or other operating instructions, one or more memories (including non-transient storage media that can store software and/or other operating instructions), a power supply for the control circuitry and/or other system components, temperature and liquid level sensors, pressure sensors, RFID interrogation devices or other machine readable indicia readers (such as those used to read and recognize alphanumeric text, barcodes, security inks, etc.), input/output interfaces (e.g., such as a user interface to display information to a user and/or receive input from a user), communication buses or other links, a display, switches, relays, triacs, motors, mechanical linkages and/or actuators, and/or other components necessary to perform desired input/output or other functions of the beverage making machine 100.

Figure 2:
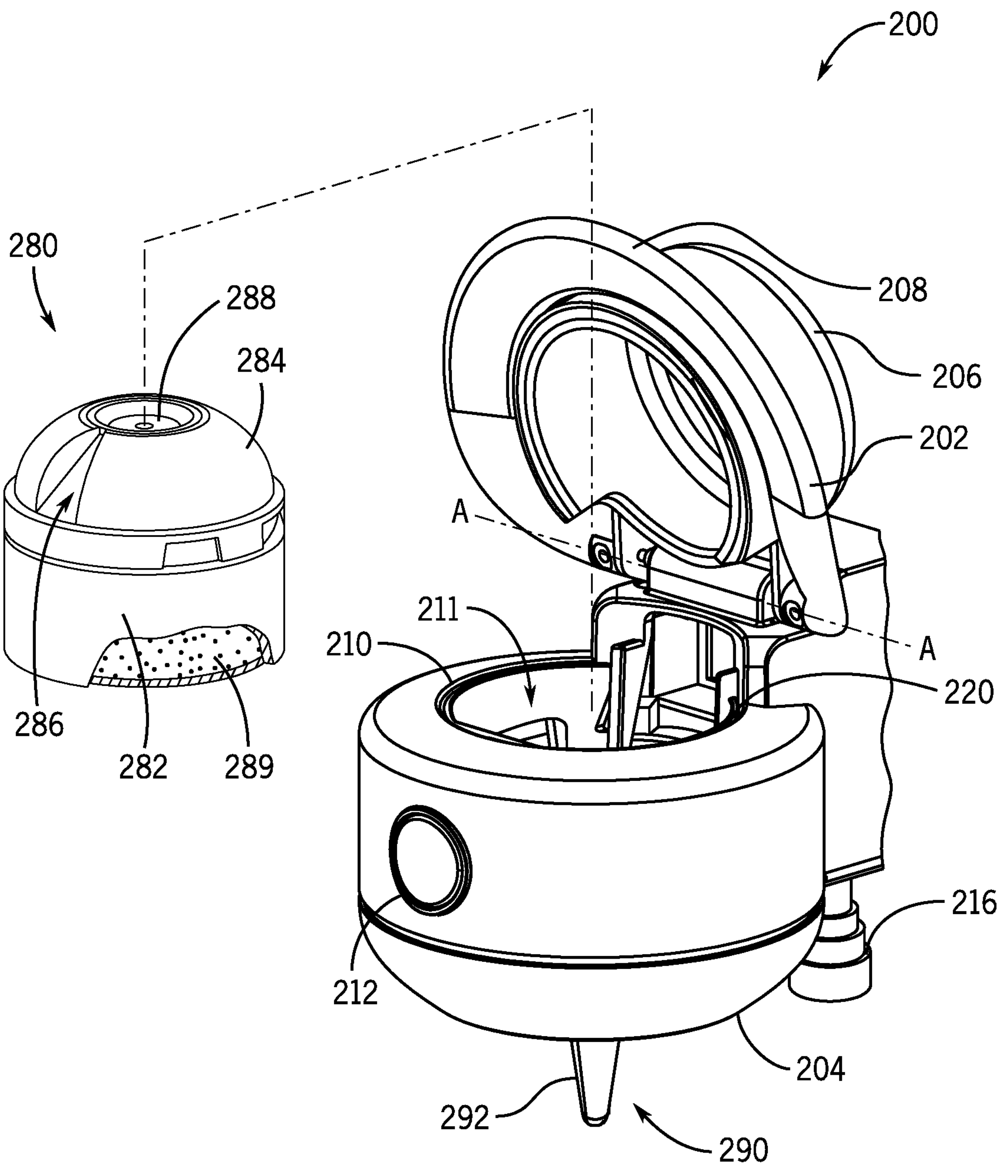
FIG. 2 depicts a sample cartridge holder and an associated cartridge.

Turning to FIG. 2, a cartridge holder 200 is shown. The cartridge holder 200 can be a component of the dispensing station 120 described above. In this regard, the cartridge holder 200 can be adapted to receive and manipulate a cartridge for producing a beverage with the beverage making machine. For example, a cartridge 280 can be provided having a beverage making material 289 contained therein. The beverage making material 289 can be used to form a beverage with the beverage making machine, such as a carbonated beverage, including certain beers. The cartridge holder 200 can be adapted to receive the cartridge 280, and can generally manipulate the cartridge 280 for release of the beverage making material 289. For example, the beverage making material 289 can be released into one or more processes of the beverage making machine, including being combined with precursor liquid, including carbonated and/or chilled liquid, and used to form the carbonated beverage product of the present disclosure.

To facilitate the foregoing, in the example of FIG. 2, the cartridge holder 200 includes a first portion 202 and a second portion 204. The first portion 202 and the second portion 204 can cooperate to receive the cartridge 280 in the cartridge holder 200. In one example, the first portion 202 can include a lid 206 and a handle 208. The second portion 204 can include a chamber 210 that defines a receiving portion 211. The lid 206 can be moved relative to the chamber 210 from a closed position to an open position to allow for entry of the cartridge 280 into the receiving portion 211. For example, the lid 206 can be associated with the chamber 210 along an axis A-A, and the lid 206 can be adapted to pivot about the axis A-A. This can be facilitated by the handle 208, which can be moveable relative to the chamber 210 and can induce movement of the lid 206 about the axis A-A.

The lid 206 can move about the axis A-A and allow the cartridge 280 to be clamped within the cartridge holder 200. Clamping the cartridge 280 within the cartridge holder 200 can facilitate release of the beverage making material 289 into one or more processes of the beverage making machine. For example, the cartridge holder 200 can include a variety of internal components that engage the cartridge 280 and cause release of the beverage making material 289. As shown in FIG. 2, the cartridge 280 can include a body 282 that defines a volume holding the beverage making material 289. The cartridge 280 can also include a cap 284 that includes a first engagement feature 286 and a second engagement feature 288. The first engagement feature 286 can be an indexing feature that is used to rotationally position the cartridge 280 with the receiving portion 211. The second engagement feature 288 can be associated with a mechanism of the cartridge 280 that facilitates release of the beverage making material 289. For example, the second engagement feature 288 can be a moveable feature of the cartridge 280 that can puncture a sealed volume of the cartridge 280 holding the beverage making material 289 when the second engagement feature 288 is moved.

Each of the first engagement feature 286 and the second engagement feature 288 can define an inlet or other opening for fluidly connecting the cartridge 280 to the cartridge holder 200. As one example, the first engagement feature 286 can include an opening to receive a stream of pressurized gas from the cartridge holder 200 and the second engagement can include an opening to emit a flow of the beverage making material 289 from the cartridge 280. The cartridge holder 200 can therefore include one or more features to engage the cartridge 280 and facilitate the foregoing functionality and engagement with the cartridge 280. For example, the cartridge holder 200 can include a gas introducing element within the receiving area for engaging the first engagement feature 286 and introducing pressurized gas to the cartridge. The cartridge holder 200 can further include an anvil or other fluid interface (e.g., fluid interface 235 of FIG. 4) therein to contact and cause movement of the second engagement feature 288 for puncture and release of the beverage making material 289 from the cartridge 280.

Figure 3:
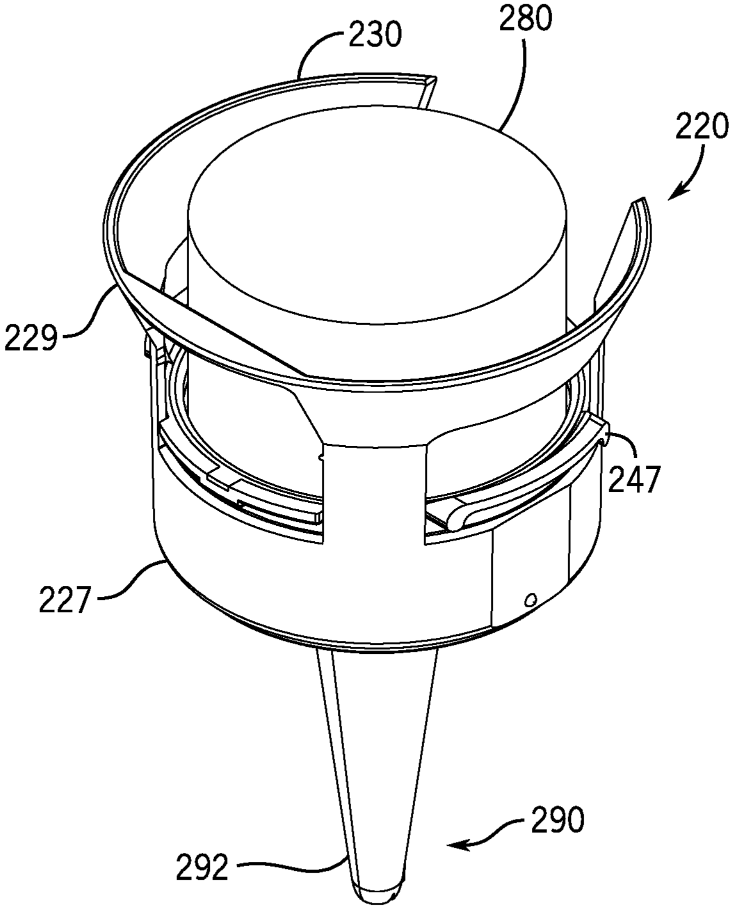
FIG. 3 depicts a basket assembly of the cartridge holder of FIG. 2 and an associated nozzle.

In this regard, the cartridge holder 200 also includes or is associated with a basket assembly 220. The basket assembly 220 can be seated or is seatable within the receiving portion 211. The basket assembly 220 can receive the cartridge 280 and position the cartridge 280 relative to corresponding engagement features of the cartridge holder 200. For example and as shown in FIG. 3, the basket assembly 220 can include a receiving section 227 and a flared section 229. The flared section 229 can be a generally conical-type structure extending tapered from a contact rim 230 about an uppermost surface of the basket assembly 220. The conical-type structure extends from the rim 230 to the receiving section 227. This flared section 229 can therefore help guide a cartridge 280 to the receiving section 227, at which the cartridge 280 is seated and associated with the various processes of the beverage making machine, as described herein.

For example, once seated in the receiving section 227, the basket assembly 220 can facilitate fluid connection of the cartridge 280 to the beverage making machine 100. This can include establishing a fluid connection between the first and second engagement features 286, 288 and conduits 216, with reference to FIG. 2, that are fluidly connected to a source of pressurized gas and/or precursor liquid. In some cases, the fluid connection can be established or more generally initiate in response to receiving an input at a user interface 212 that is positioned along an exterior of the cartridge holder 200. The user interface 212, for example, can initiate a brewing process that allows the beverage making machine to produce a carbonated beverage product using the beverage making material 289.

In FIG. 3, the basket assembly 220 is shown removed from the cartridge holder 200. The basket assembly 220 can be selectively removable from the cartridge holder 200 and interchangeable and replaceable as needed, and to accommodate different beverage making machines and requirements. In some cases, the flared section 229 of the basket assembly 220 help position the basket assembly 220 within the receiving portion 211 of the cartridge holder 200. For example, the flared section 229 can define a shelf or ledge that can rest on a complementary component of the cartridge holder 200. The contact rim 230 can also help with removable attachment, and can be configured to define a mating engagement, and optionally a flush transition, between the chamber 210 and the basket assembly 220 within the cartridge holder 200. Further shown in FIG. 3, the basket assembly 220 can include the mating features 247. The mating features 247 can include one or more tabs that protrude and extend radially from the basket assembly 220. The mating features 247 can facilitate locking the basket assembly 220 at a specified location in the chamber 210. For example, the mating features 247 can be adapted to connect with complementary features in the chamber 210 to rotationally position the basket assembly 220 therein.

The cartridge holder 200 is shown in FIGS. 2 and 3 as being associated with a nozzle 290. As explained in greater detail below with respect to FIGS. 5 and 6, the nozzle 290 can generally be an elongated structure that extends from the basket assembly 220 for delivery of a carbonated beverage product from the cartridge holder 200. The nozzle 290 can be sufficiently elongated in order to extend into a receptacle that is associated with the beverage making machine 100 and converge or otherwise direct a stream of the carbonated beverage product relative to a specified position in the receptacle. This can control or influence a foam height of the carbonated beverage product in the dispensed format in the receptacle. As one example, the nozzle 290 can include an alignment feature 292 along an exterior surface of the nozzle 290. In association with a dispense, the receptacle can be positioned relative to the alignment feature 292 and thus the stream of the carbonated beverage product can be emitted at a specified offset from a wall of the receptacle, thereby facilitating foam control. Additionally or alternatively, other features of the nozzle 290 can facilitate foam control, including the adaptability of the nozzle 290 converge the carbonated beverage product along a specified funnel height and/or through a specified width of a dispense outlet, as described herein.

Figure 4:
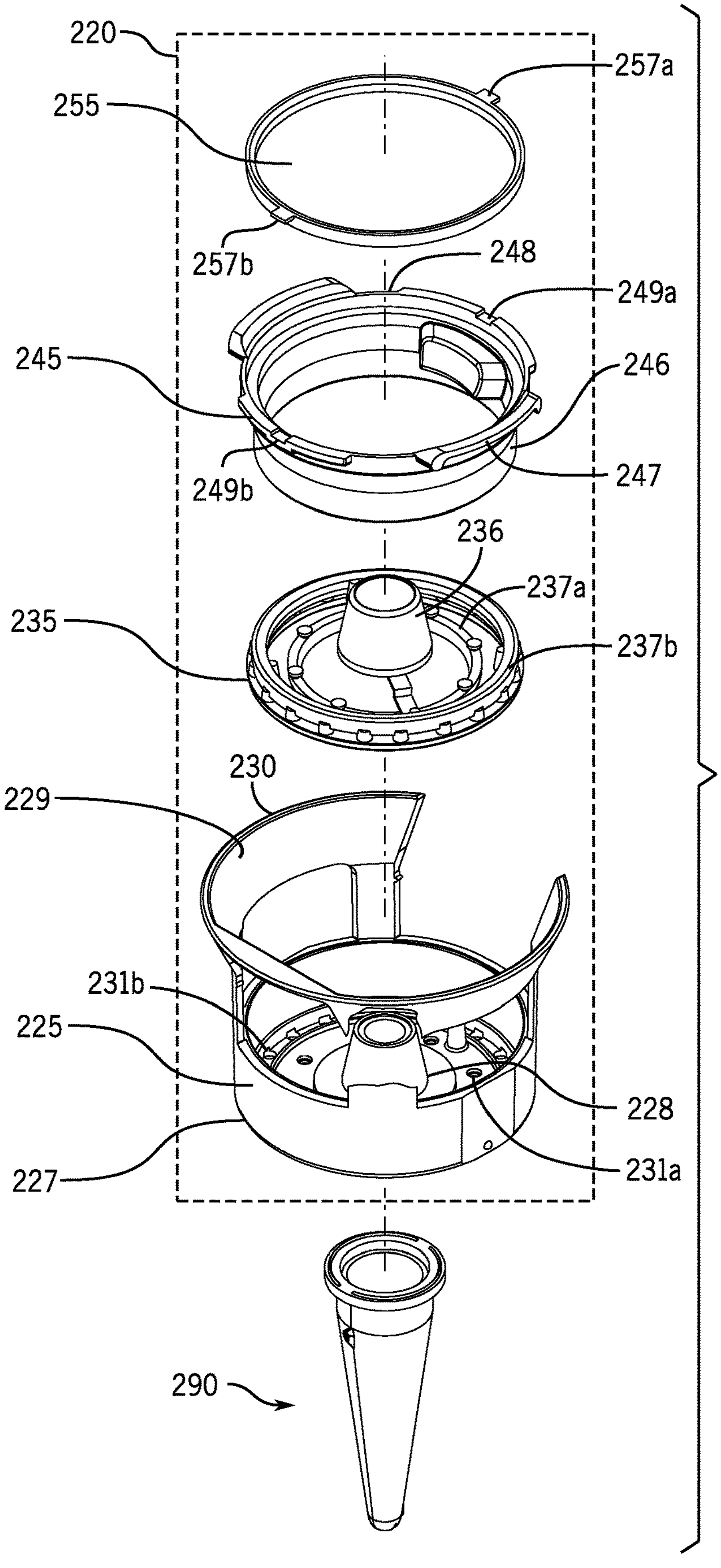
FIG. 4 depicts an exploded view of the basket assembly and nozzle of FIG. 3.

With reference to FIG. 4, an exploded view of the basket assembly 220 and nozzle 290 is shown. Broadly, the basket assembly 220 can include a basket portion 225, a fluid interface 235, a mating section 245, and a ring 255. The basket portion 225, the fluid interface 235, the mating section 245, and the ring 255 can cooperate with one another to secure the basket assembly 220 within the cartridge holder 200, and associate the cartridge 280 and the nozzle 290 with one another and/or one or more processes of the beverage making machine 100.

For example, the basket portion 225 can generally define the receiving section 227, the flared section 229, and the rim 230; each described above in relation to FIG. 3. As shown in FIG. 4, the receiving section 227 can define a generally cylindrical shape that can roughly correspond to the cylindrical shape of the body 282 of the cartridge 280. The receiving section 227 can also house and/or partially define components of the basket assembly 220 that facilitate fluid connection of the cartridge 280 and the nozzle 290. For example and shown in partial cutaway in FIG. 4, the basket portion 225 can define a nozzle feature 228. The nozzle feature 228 can be configured to direct flow of the beverage making material 289 or beverage product more generally from the cartridge 280 toward and into the nozzle 290. Once received in the nozzle 290, the nozzle 290 can operate to converge the flow of foam control of the carbonated beverage product in the dispensed format in the receptacle.

The fluid interface 235 is arrangeable adjacent the basket portion 225. The fluid interface 235 can cooperate with the basket portion 225 to deliver the flow of beverage product to the nozzle 290. For example and as shown in FIG. 4, the fluid interface includes a complimentary nozzle interface 236. The complimentary nozzle interface 236 can be received in or over the nozzle feature 228 of the basket portion 225. The complimentary nozzle interface 236 can in certain embodiments be installed in contact with the nozzle 290 and/or otherwise facilitate connection of the nozzle 290 to the basket assembly 220. For example, a portion of the complementary nozzle interface 236 can be seated at least partially into the nozzle 290, and optionally releasable engaged with the nozzle 290. The fluid interface 235 can thus also help align the nozzle 290 within the basket assembly 220. As shown in FIG. 4, the fluid interface 235 includes an inner alignment feature 237*a* and an outer alignment feature 237*b*. The inner alignment feature 237*a* and the outer alignment feature 237*b* and be associated with an inner basket alignment feature 231*a* and an outer basket alignment feature 231*b*, respectively.

The mating section 245 can be removably attachable to the basket portion 225 and facilitate connection of the basket portion 225 to the cartridge holder 200. For example, the mating section 245 can be defined by a body section 246 and a flange section 248. The body section 246 can generally be a tubular structure that is positionable into the basket portion 225. The flange section 248 can define a mating surface for attachment of the ring 255 thereon. For example, the flange section 248 can include receiving features 249*a*, 249*b*. The ring 255 can define corresponding tabs 257*a*, 257*b* that are positionable on corresponding ones of the receiving features 249*a*, 249*b* to snap or lock the ring 255 onto the mating section 245. As such, the ring 255 can help secure the mating section 245 in the basket assembly 220. The mating section 245 can include the mating features 247 discussed above that facilitate the removable attachment of the basket assembly 220 to the cartridge holder 200.

Figure 5:
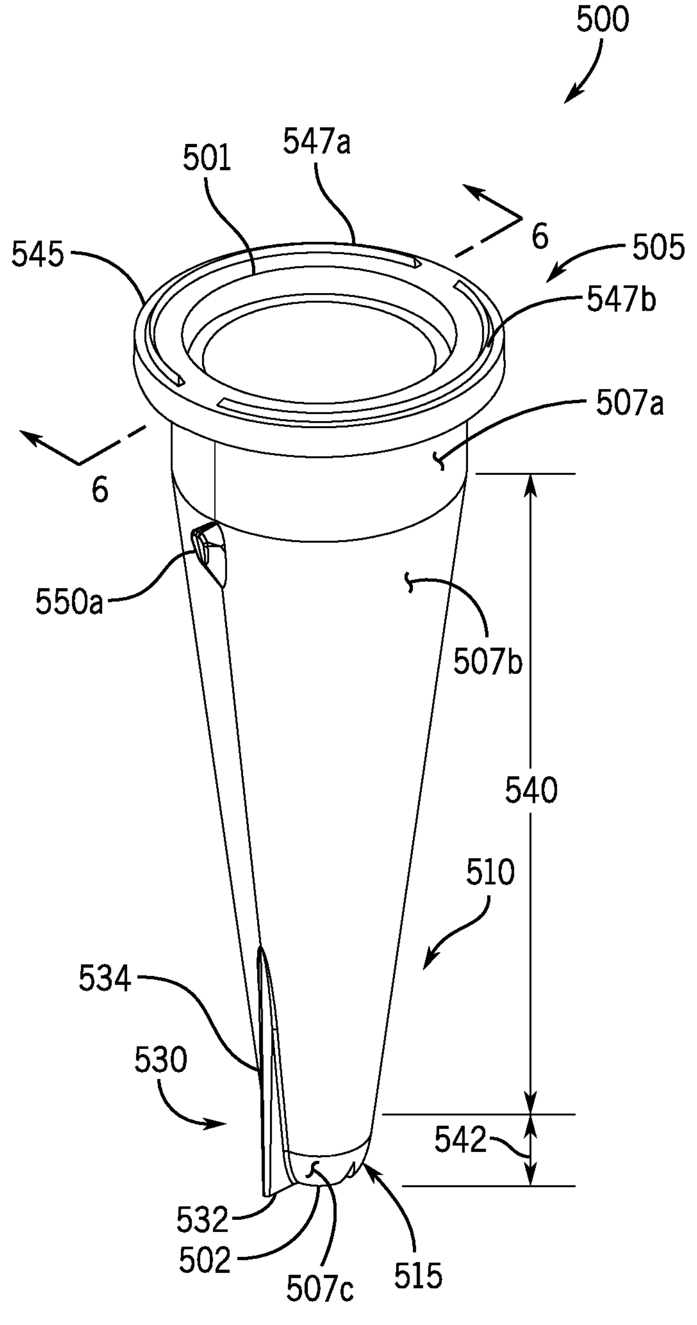
FIG. 5 depicts a sample nozzle of the present disclosure.

FIG. 5 depicts a nozzle 500. The nozzle 500 can be substantially analogous to any of the nozzles described herein, such as the nozzles 125 and 290 of FIGS. 1 and 2, respectively. In this regard, the nozzle 500 can be adapted to control and/or direct a stream of a carbonated beverage product from a beverage making machine, such as during a dispense operation. More specifically, the nozzle 500 can be adapted to tune the amount of foam induced in the carbonated beverage product in a dispensed format in a receptacle. For example, the nozzle 500 can be a substantially elongated structure that can be used to extend at least partially into the receptacle, potentially reducing the distance the carbonated beverage product travels between the nozzle 500 and the receptacle. This can reduce the level of foam induced in the receptacle. Further, the size, shape, and contour of the nozzle 500 can be adapted to tune the level of foam, as desired for a given application, such as having a longer or shorter elongated structure in order to induce less or more foam. In some cases, the nozzle 500 can also define an offset or other location feature for the stream of the carbonated beverage product relative a wall or other contact surface of a receptacle.

To facilitate the foregoing, the nozzle 500 can include an engagement portion 505, a funnel portion 510, and a dispense portion 515. The engagement portion 505 can be configured for releasable attachment with a beverage making machine (e.g., the beverage making machine 100 of FIG. 1). At the engagement portion 505, the nozzle 500 can include a nozzle inlet 501 that is adapted to receive carbonated beverage product from the beverage making machine. The funnel portion 510 can extend elongated from the engagement portion 505. The funnel portion 510 can be configured to converge a flow of the carbonated beverage product. For example, the funnel portion 510 can be a generally conical structure to restrict or reduce a width of the nozzle 500 as the carbonated beverage product propagates through the nozzle 500. The dispense portion 515 can extend from the funnel portion 510 and be configured to establish a stream of the carbonated beverage product into a receptacle. For example, at the dispense portion 515, the nozzle 500 can include a nozzle outlet 502 that defines an exit for the carbonated beverage product form the nozzle 500.

Figure 6:
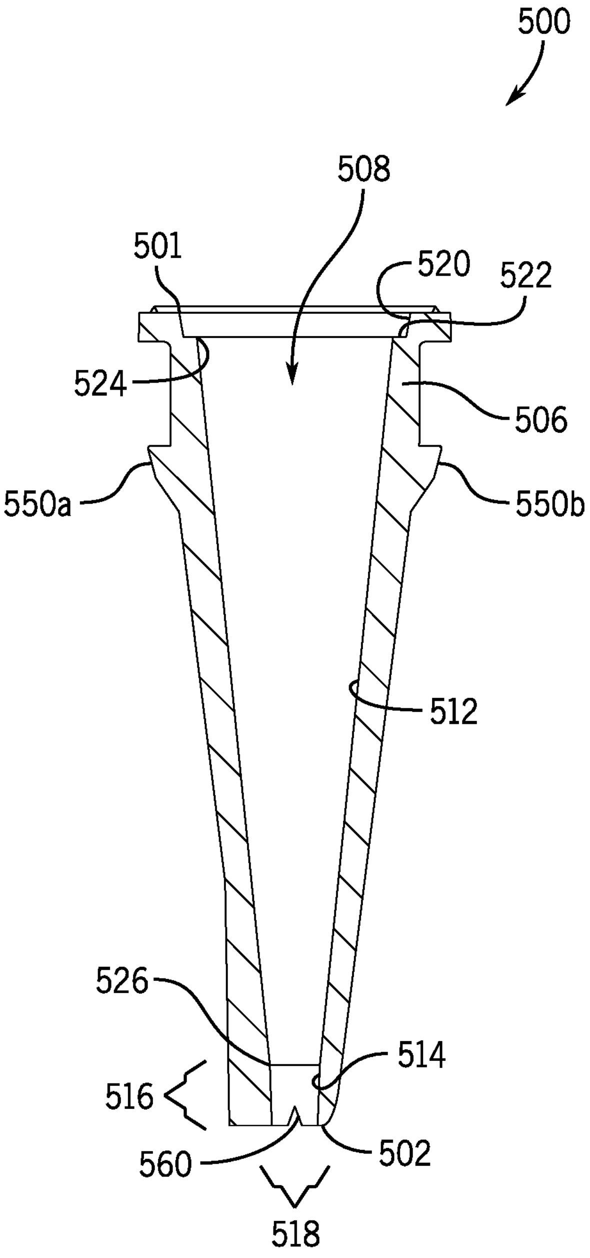
FIG. 6 depicts a cross-sectional view of the nozzle of FIG. 5, taken along line 6-6 of FIG. 5.

The nozzle 500 can be adapted to define an offset between a stream of the carbonated beverage product (e.g., as emitted from the nozzle outlet 502) and a wall of a receptacle. To facilitate the foregoing, the nozzle 500 is shown in the example of FIG. 5 as including an alignment feature 530. The alignment feature 530 can extend along an exterior of one or both of the funnel portion 510 or the dispense portion 515. For example, the nozzle 500 can have a funnel portion exterior 507_b_ at the funnel portion and a dispense portion exterior 507_c_ at the dispense portion 515. The funnel portion exterior can have a funnel portion height 540 and the dispense portion exterior 507_c_ can have a dispense portion height 542. In the example of FIGS. 5 and 6, the alignment feature extends along the dispense portion height 542 and a subset of the funnel portion height 540.

The alignment feature 530 can be a ridge or generally raised surface that extends along the exteriors 507_b_, 507_c_. The alignment feature 530 can therefore be pressed against a surface of a glass or other receptacle, and the alignment feature 530 can define an offset between the receptacle and the stream of carbonated beverage product emitted from the nozzle 500. The dimensions of the alignment feature 530 can be tuned in this regarded so that the offset exhibits a specified value.

In the examples of FIGS. 5 and 6, the alignment feature 530 is shown as including a fin 532. The fin 532 can be an elongated and raised structures along the exteriors 507_b_, 507_c_. In other cases, the fin 532 can be contained within one of the exteriors 507_b_, 507_c_. The fin 532 is shown in FIG. 5 as including a contact surface 534. The contact surface 534 can be configured for engagement with a receptacle for proper positioning of the receptacle relative to the nozzle and carbonated beverage product stream during a dispensing operation. In some cases, the contact surface 534 can define a substantially flat, and vertically orientated surface when the nozzle 500 is installed with a beverage making machine. In other cases, the contact surface 534 can be a contoured surface, such as a contoured surface designed to match the contour of an interior surface of a receptacle, such as the interior wall of a pint glass, as one example.

The carbonated beverage product can flow into the nozzle 500 via the nozzle inlet 501 and exit the nozzle 500 via the nozzle outlet 502. With reference to FIGS. 5 and 6, the nozzle 500 can be a one-piece, integrally formed structure that defines the path of a carbonated beverage product between the nozzle inlet 501 and the nozzle outlet 502. In this regard, the nozzle 500 can be defined by a body 506 defining the one piece structure. The body 506 can define an internal chamber 508 therethrough that extends from the nozzle inlet 501 to the nozzle outlet 502. More generally, the body 506 can also define one or more of, or all of, the engagement portion 505, the funnel portion 510, the dispense portion 515, or the alignment feature 530. In this regard, the engagement portion 505, the funnel portion 510, the dispense portion 515, and the alignment features 530 can, in certain examples, all be formed from a common material that extends substantially continuously between the respective components. As such, the body 506 can define an engagement exterior 507_a_ at the engagement portion 505, the funnel exterior 507_b_ at the funnel portion 510, the dispense exterior 507_c_ at the dispense portion 515, and the contact surface 534 at the alignment feature 530.

Internally, the nozzle 500 can define various contours to facilitate flow of the carbonated beverage product therethrough. In the examples of FIGS. 5 and 6, the internal chamber 508 of the nozzle 500 can include a mating section 520 at the engagement portion 505, a tapered section 512 at the funnel portion 510, and a tubular section 514 at the dispense portion 515. The mating section 520 can receive a flow of carbonated beverage product from a beverage making machine. The carbonated beverage product can advance from the mating section 520 and to the tapered section 512. In some cases, the internal chamber 508 can have an internal discontinuity 524 between the mating and tapered sections 520, 512. The tapered section 512 can operate to converge a flow of the carbonated beverage product. For example, the tapered section 512 can be a section of the internal chamber 508 having a cross-sectional area that reduces along a length of the nozzle 500. This can help define a more concentrated or direct stream of the carbonated beverage product, including increasing a flow rate and/or pressure of the product for subsequent dispense. The carbonated beverage product can advance from the tapered section 512 to the tubular section 514. In some cases, the internal chamber 508 can have an internal continuity 526 between the tapered and tubular sections 512, 514. The tubular section 514 can generally operate to dispense the carbonated beverage product from the nozzle 500, such as through the nozzle outlet 502. The tubular section 514 can have a tubular section height 516 and a tubular section width 518 that is substantially constant along the tubular section height 516. In this regard, the tubular section 514 can operate to induce a consistent, measured flow of the carbonated beverage product as the product exits the nozzle 500.

As described herein, the nozzle 500 can be removably attachable with a beverage making machine. For example, the nozzle 500 can be removably attachable with a beverage making machine at the engagement portion 505. The nozzle 500 of FIGS. 5 and 6 shows various features that support the removable attachment of the nozzle 500 to the beverage making machine. For example, at the engagement portion 505, the nozzle can include a flange 545. The flange 545 can be a structural component of the nozzle 500 that generally extends around, and out from, the nozzle inlet 501. The flange 545 can be adapted to fit partially or fully into a component of the beverage making machine, such as with one or more components of a basket assembly, as one example. The flange 545 is shown in the examples of FIGS. 5 and 6 as including a first engagement features 547*a* and a second engagement feature 547*b*. The first and second engagement features 547*a*, 547*b* can be grooves or recesses, and one or more components of the beverage making machine can be inserted into the engagement features 547*a*, 547*b* to facilitate the removable attachment of the nozzle 500 and the beverage making machine 100. Additionally or alternatively, the engagement features 547*a*, 547*b* can include raised surfaces, optionally including lip features and the like, for receipt and interlocking with complementary features of the beverage making machine.

The nozzle 500 can also include features internally to facilitate the removable attachment of the nozzle 500 and the beverage making machine. For example and as shown in the example of FIG. 6, the nozzle 500 can include a recessed ring 522 at the engagement portion 505. A component, such as various nozzle features described herein of the beverage making machine, can optionally be received by the nozzle inlet and seated at the recessed ring 522. This can establish a leak-resistant interface between the beverage making machine and the nozzle 500.

The nozzle 500 can include additional features to facilitate the removable attachment of the nozzle and beverage making machine. FIGS. 5 and 6 show a first wing 550*a* and a second wing 550*b*. The first and second wings 550*a*, 550*b* can be used to facilitate alignment of the nozzle 500 with the beverage making machine. For example, the wings 550*a*, 550*b* can in certain embodiment be used to contact a wall of an inner annular surface of the beverage making machine, facilitating stabilization and alignment of the nozzle in the beverage making machine. In other cases, the wings 550*a*, 550*b* can be omitted.

At the dispense portion 515, the nozzle 500 can include multiple features to control the stream of the carbonated beverage product from the nozzle 500. In the example of FIGS. 5 and 6, the nozzle 500 includes notches 560 at the dispense portion 510. The notches 560 can be substantially v-shaped cuts extending into the body 506 and about the nozzle outlet 502. This can increase a volume of fluid released from the nozzle outlet 502, and optionally change a profile of the stream of the carbonated beverage product released therefrom.

FIG. 7 depicts a cross-sectional view of an assembly 700, including a basket assembly 710 and a nozzle 730. The basket assembly 710 can be substantially analogous to the basket assembly 220 described above in relation to FIGS. 2-4. As such, the basket assembly 710 can include engagement features 712, a basket portion 716, a fluid interface 718, a mating structure 720, and a ring 722; redundant explanation of these components is omitted for clarity. Further, the nozzle 730 can be substantially analogous to the nozzle 500 described above in relation to FIGS. 5 and 6, and can include an alignment feature; redundant explanation of these components is omitted for clarity. Further, the nozzle 730 can be substantially analogous to the nozzle 500 described above in relation to FIGS. 5 and 6, and can include an alignment feature 734; redundant explanation of which is omitted for clarity.

In FIG. 7, the assembly 700 is shown during a dispense operation. Specifically, a cartridge 705 having a beverage making material 706 is associated with the basket assembly 710. The cartridge 705 is associate with the basket assembly 710 in a manner that allows the basket assembly 710 to facilitate release of the beverage making material 706 into one or more processes of a beverage making machine.

FIG. 7 shows the nozzle 730 removably attached to the basket assembly 710. The nozzle assembly includes engagement features 732, which can include a flanged surface and one or more features formed into or from the surface for attachment of the nozzle 730 with the beverage making machine. For example, the engagement features 732 can be similar to the engagement features 547*a*, 547*b* shown and described in relation to FIGS. 5 and 6, and/or be mounted at a surface integrated with the flange 545. The engagement features 732 shown in FIG. 7 are associated with the basket portion 716. For example, the engagement features 732 can define a lip or annular surface that is at least partially inserted into a receiving region of the basket portion 716.

Further shown in FIG. 7, the nozzle 730 is also releasably attachable to the basket assembly 710 at the fluid interface 718. Shown schematically in FIG. 7, the fluid interface 718 can include carbonated beverage product 790, such as that produced by the beverage making machine 100. The fluid interface 718 can be seated at least partially in the nozzle 730. For example, the nozzle 730 can define a recessed ring 733 and the fluid interface 718 can be partially inserted into the nozzle 730 at the recessed ring 733. This can facilitate a leak-resistant connection between the fluid interface 718 and the nozzle 730, in certain applications.

In FIG. 7, the carbonated beverage product 790 is advanced through the nozzle 730 and into a receptacle 750. The receptacle 750 can be any of a variety of appropriate containers for receiving a carbonated beverage product. For example, a pint glass or other glassware can be used to receive a carbonated beverage product, such as a beer, and present the beer in a dispensed format for consumption from the receptacle 750. The receptacle 750 can include walls 752 that define a volume 754. The nozzle 730 can be inserted at least partially into the volume 754 during a dispense operation, such as that shown in FIG. 7. The nozzle 730 includes an alignment feature 734 along an exterior of the nozzle 730. The alignment feature 734 defines a contact surface 736 that is adapted to contact the wall 752 of the receptacle 750. The alignment feature 734 can have a size, shape, and contour to define an offset 731 between a stream 792 of the carbonated beverage product 790 and the wall 752.

In operation, the foregoing structural elements can cooperate to control a foam height of the carbonated beverage product 790 in the dispensed format in the receptacle 750. For example and as shown in FIG. 7, the carbonated beverage product 790 can be emitted from the nozzle 730 along the stream 792. In the receptacle 750, the carbonated beverage product 790 can have a substantially liquid section 794 and a substantially foam section 796. The substantially foam section 796 can have a foam height 798. The foam height 798 can depend, in part, on the turbulence and stream of the carbonated beverage product 790 from the nozzle 730 and into the receptacle 750. In this regard, the nozzle 730 can extend into the volume 754 and position the stream 793 relative to the wall 752 to control the turbulence and stream path of the carbonate beverage product 790. In this regard, the nozzle 730 can be dimensioned to induce a calibrated turbulence and flow path of the carbonated beverage product 790 so that the foam height has a predetermined value. The foam height 798 can thus be controlled in this manner, which impacts presentation and taste of the carbonated beverage product 790 in the dispensed format in the receptacle.

FIG. 8 depicts a cross-sectional view of an assembly 800, including a basket assembly 810 and a nozzle 830. In the embodiment of FIG. 8, the nozzle 830 can be an alternative nozzle design that sits substantially above a receptacle 850 during a dispense operation of a beverage making machine. In this manner, a carbonated beverage product 890 emitted from the nozzle 830 can exhibit a large foam height 898 than that emitted with the nozzle 730 shown in FIG. 7.

In the example of FIG. 8, the assembly can include the basket assembly 810. The basket assembly 810 can be substantially analogous to any of the basket assemblies described herein, and include engagement features 812, a basket portion 816, a fluid interface 818, a mating surface 820, and ring 822; redundant explication of which is omitted here for clarity. The nozzle 830 can include nozzle engagement features 832 for removable attachment of the nozzle 830 with the basket assembly 810. Further, the receptacle 850 shown in FIG. 8 can be substantially analogous to the receptacle 750 shown in FIG. 7 and include a wall 852, and volume 854; redundant explanation of which is omitted here for clarity.

The carbonated beverage product 890 can flow through the nozzle 730 and emitted therefrom forming a stream 892. In the dispensed format in the receptacle 850, the carbonated beverage product 890 can have a substantially liquid section 894 and a substantially foam section 896. The substantially foam section 896 can have a foam height 898. The foam height 898 can depend, in part, on the turbulence and stream of the carbonated beverage product 890 from the nozzle 830 and into the receptacle 850. In part due the nozzle 830 sitting substantially above the receptacle 850, the turbulence of the carbonated beverage product 890 can be greater, thus resulting in the foam height 898 being greater. In this regard, a user of a beverage making machine can replace the nozzle 830 with the nozzle 730 for the production of a carbonated beverage product, such as beer, thereby controlling the foam height of the dispensed product.

Figure 9:
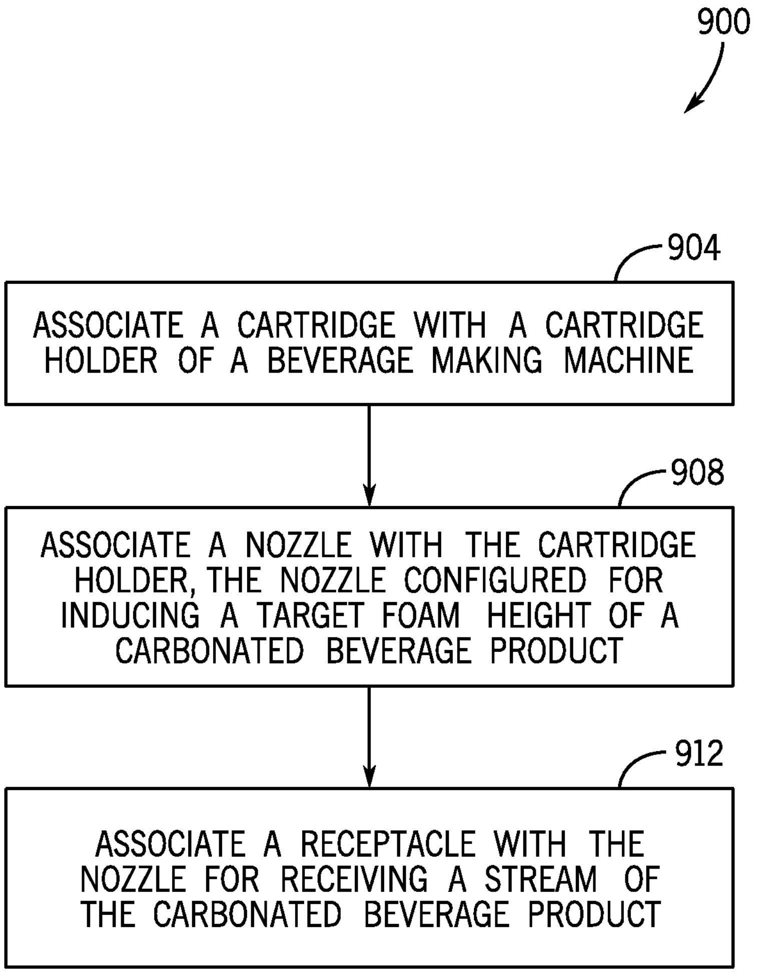
FIG. 9 depicts a flow diagram for producing a carbonated beverage product with a beverage making machine.

To facilitate the reader's understanding of the various functionalities of the embodiments discussed herein, reference is now made to the flow diagram in FIG. 9, which illustrates process 900. While specific steps (and orders of steps) of the methods presented herein have been illustrated and will be discussed, other methods (including more, fewer, or different steps than those illustrated) consistent with the teachings presented herein are also envisioned and encompassed with the present disclosure.

In this regard, with reference to FIG. 9, process 900 relates generally to a method for producing a carbonated beverage product with a beverage making machine. The process 900 may be used with any of the beverage making machines and nozzles described herein, for example, such as the beverage making machine 100 and nozzles 125, 290, 500, 730 and variations and combinations thereof.

At operation 904, a cartridge is associated with a cartridge holder of a beverage making machine. For example and with reference to FIG. 2, a cartridge 280 is associated with a cartridge holder 200. The cartridge 280 can include beverage making material 289 contained therein. The cartridge 280 can be manipulated by the beverage making machine 100 to release the beverage making material 289 for forming a carbonated beverage product. The carbonated beverage product can have a target foam height in a dispensed format. For example, the carbonated beverage product can be a beer product that has a foam height that is based on a type of beer, such as a relatively short foam height for light-variety beer product and a relatively taller foam height for heavy-variety beer product.

At operation 908, a nozzle is associated with the cartridge holder. The nozzle is configured for inducing a target foam height of a carbonated beverage product in a dispensed format. For example and with reference to FIGS. 4-6, a nozzle 500 can be associated with the cartridge holder 200, in certain embodiments. The nozzle 500 can be configured for inducing the target foam height of the carbonated beverage product in this dispensed format. The nozzle 500 can generally define an elongated section extending elongate from the cartridge holder 200 for defining a stream of the carbonated beverage product. As one example, the nozzle can include a funnel portion 510 that converges a flow of the carbonated beverage product as the product exits the machine.

At operation 912, a receptacle is associated with the nozzle for receiving a stream of the carbonated beverage product. For example and with reference to FIG. 7, a receptacle 750 is associated with a nozzle 730. The receptacle 750 can be adapted to receive a stream 792 of a carbonated beverage product 790 for presenting the carbonated beverage product 790 in a dispensed format. In operation, the nozzle 730 can be arranged to extend into a volume 754 of the receptacle and to contact a wall 752 of the receptacle 750. The stream 792 can therefore be arranged relative to the receptacle 750 in order to induce a target foam height of the carbonated beverage product 790 in the receptacle 750. For example, the carbonated beverage product 790 can have a target foam height within the range of 20 mm to 100 mm in a dispensed format. In this regard, the nozzle 700 can be arranged to output the stream 792 into the receptacle 750 so that the product 790 has a foam height 798 in the dispensed format that corresponds to the target foam height.

Other examples and implementations are within the scope and spirit of the disclosure and appended claims. For example, features implementing functions may also be physically located at various positions, including being distributed such that portions of functions are implemented at different physical locations. Also, as used herein, including in the claims, "or" as used in a list of items prefaced by "at least one 'of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

The foregoing description, for purposes of explanation, uses specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A nozzle for controlling foam of a carbonated beverage product produced by a beverage making machine, comprising:

an engagement portion configured for releasable attachment with the beverage making machine and defining a nozzle inlet adapted to receive the carbonated beverage product from the beverage making machine;

a funnel portion extending elongated from the engagement portion and configured to converge a flow of the carbonated beverage product;

a dispense portion defining a tubular section having a tubular section height and a tubular section width that is substantially constant along the tubular section height, and a nozzle outlet configured to establish a stream of the carbonated beverage product into a receptacle; and an alignment feature consisting of a triangular fin having a first linear contact surface extending parallel to a centerline of the nozzle along an exterior of the funnel portion from above the tubular section to the nozzle outlet and a second linear contact surface extending perpendicular to the centerline of the nozzle at the nozzle outlet and configured to define an offset between a wall of the receptacle and the stream of the carbonated beverage product.

2. The nozzle of claim 1, further comprising a body defining each of engagement portion, the funnel portion, and the dispense portion, the body having an internal channel extending therethrough between the nozzle inlet and the nozzle outlet.

3. The nozzle of claim 2, wherein the internal channel is tapered, internally from the nozzle inlet.

4. The nozzle of claim 2, wherein the internal channel defines a mating section comprising a recessed ring at the nozzle inlet configured to receive a component of beverage making machine associated with a dispense of the carbonated beverage product.

5. The nozzle of claim 2, wherein the body is formed from a single piece of material.

6. The nozzle of claim 1, wherein the engagement portion comprises a flange that extends circumferentially about the nozzle inlet, the flange defining one or more engagement features for releasably attaching the nozzle to the beverage making machine.

7. The nozzle of claim 1, further comprising one or more wings protruding laterally from an exterior of the funnel portion.

8. A method of producing a carbonated beverage product with a beverage making machine, the method comprising:

associating a cartridge with a cartridge holder of the beverage making machine, the cartridge containing a beverage making material used by the beverage making machine to form the carbonated beverage product, the carbonated beverage product having a target foam height in in a dispensed format;

associating a nozzle with the cartridge holder, the nozzle configured for inducing the target foam height of the carbonated beverage product, and the nozzle including an engagement portion, a funnel portion, a dispense portion, and an alignment feature;

the engagement portion configured for releasable attachment with the beverage making machine and defining a nozzle inlet adapted to receive the carbonated beverage product from the beverage making machine;

the funnel portion extending elongated from the engagement portion and configured to converge a flow of the carbonated beverage product;

the dispense portion defining a tubular section having a tubular section height and a tubular section width that is substantially constant along the tubular section height, and a nozzle outlet configured to establish a stream of the carbonated beverage product into a receptacle; and the alignment feature consisting of a triangular fin having a first linear contact surface extending parallel to a centerline of the nozzle along an exterior of the funnel portion from above the tubular section to the nozzle outlet and a second linear contact surface extending perpendicular to the centerline of the nozzle at the nozzle outlet and configured to define an offset between a wall of the receptacle and the stream of the carbonated beverage product; and associating a receptacle with the nozzle, the receptacle being adapted to receive the stream of the carbonated beverage product for presenting the carbonated beverage product in the dispensed format.

9. The method of claim 8, further comprising producing, using the beverage making machine, the carbonated beverage product from the beverage making material, the producing comprising dispensing the carbonated beverage product via the nozzle.

* * * * *